(12) United States Patent
Clarke et al.

(10) Patent No.: US 12,218,901 B2
(45) Date of Patent: Feb. 4, 2025

(54) SERVER NODE AND CHAT SERVER SYSTEM FOR SELECTIVELY CONTROLLING ACCESS TO CHAT LOGS

(71) Applicant: Zoom Video Communications, Inc., San Jose, CA (US)

(72) Inventors: Lisa Munter Clarke, Greenbrae, CA (US); Vimal Earnest, Arcadia, CA (US); Sharvari Nerurkar, Everett, WA (US); Adi David Regev, Fair Lawn, NJ (US); Jianping Shen, Suzhou (CN)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/133,224

(22) Filed: Apr. 11, 2023

(65) Prior Publication Data
US 2024/0348573 A1    Oct. 17, 2024

(51) Int. Cl.
*H04L 51/42* (2022.01)
*G06F 21/60* (2013.01)
*H04L 51/216* (2022.01)

(52) U.S. Cl.
CPC ............ *H04L 51/42* (2022.05); *G06F 21/602* (2013.01); *H04L 51/216* (2022.05)

(58) Field of Classification Search
CPC ...... G06F 21/602; H04L 51/216; H04L 51/42
See application file for complete search history.

(56) References Cited

U.S. PATENT DOCUMENTS

| | | |
|---|---|---|
| 2015/0127741 A1 | 5/2015 | Leacock et al. |
| 2017/0331772 A1 | 11/2017 | Stillabower |
| 2019/0109829 A1* | 4/2019 | Kim ...................... H04L 9/0861 |
| 2021/0281529 A1* | 9/2021 | Baron ..................... H04L 51/42 |
| 2022/0014492 A1* | 1/2022 | Botwick ........... G06F 16/90344 |
| 2022/0400093 A1 | 12/2022 | Kruk |

OTHER PUBLICATIONS

EP International Search Report and Written Opinion for PCT/US2024/021467 mailed Jun. 17, 2024.

* cited by examiner

*Primary Examiner* — Gil H. Lee
(74) *Attorney, Agent, or Firm* — Kilpatrick Townsend & Stockton LLP

(57) ABSTRACT

Some examples relate to locally storing a chat conversation history at an on-premises data center. As one example, a system can receive a chat message from a first client device of a first participant in a chat conversation. In response to receiving the chat message, the system can determine a data center associated with the first participant. The system can then transmit the text chat message to a server node in the data center. The server node can be configured to transmit a command to a database system of the data center. The command can be configured to cause the database system to store a copy of the text chat message in a chat log associated with the chat conversation. The system can also transmit the text chat message to a second client device of a second participant in the chat conversation.

22 Claims, 5 Drawing Sheets

SERVER NODE AND CHAT SERVER SYSTEM FOR SELECTIVELY CONTROLLING ACCESS TO CHAT LOGS

TECHNICAL FIELD

The present application generally relates to chat messaging and, more particularly, relates to a server node and chat server system for selectively controlling access to chat logs (e.g., chat conversation history).

BRIEF DESCRIPTION OF THE DRAWINGS

The accompanying drawings, which are incorporated into and constitute a part of this specification, illustrate one or more certain examples and, together with the description of the examples, serve to explain the principles and implementations of the certain examples.

DETAILED DESCRIPTION

Figure 1:
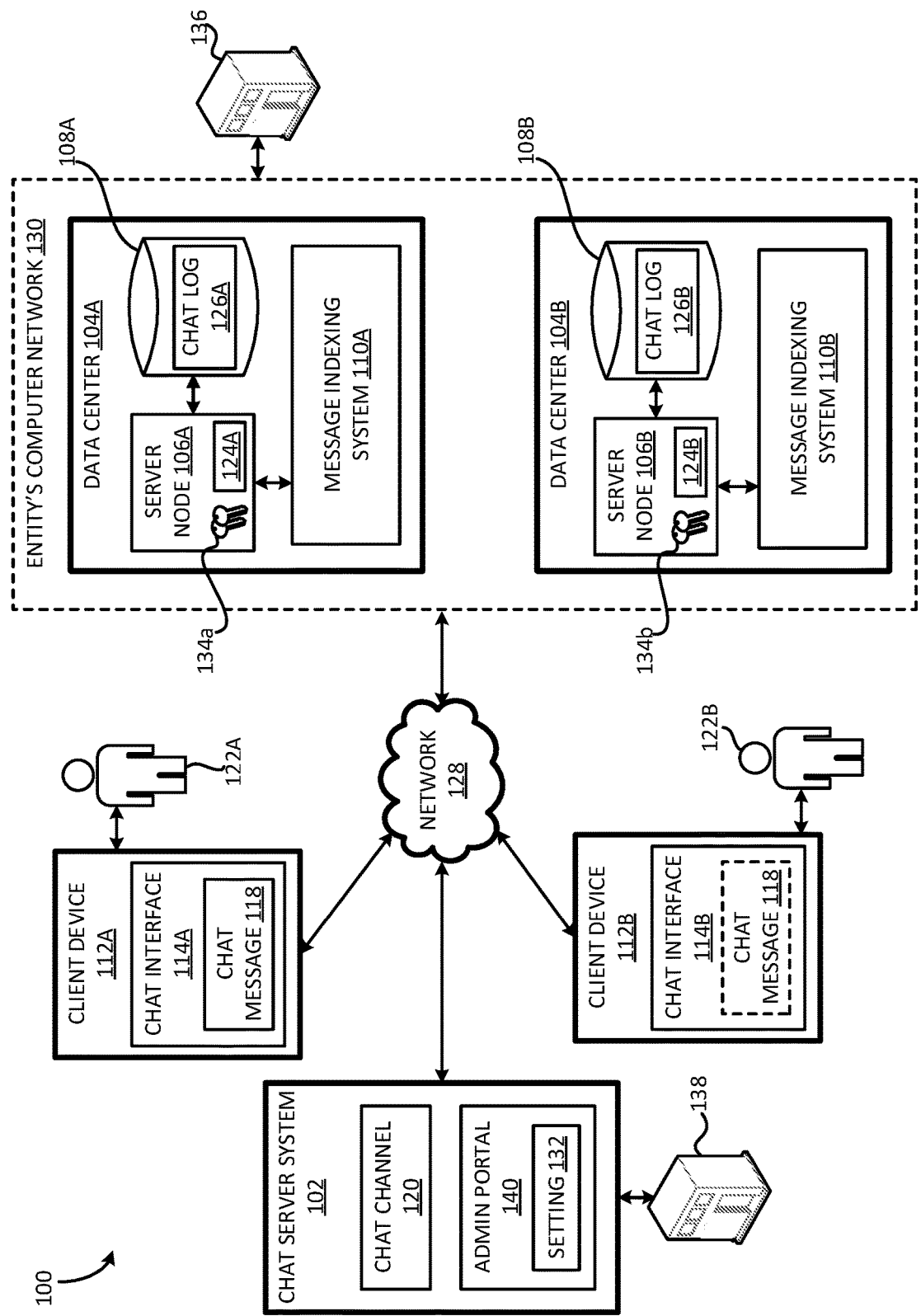
FIG. 1 shows a block diagram of an example of a system according to some aspects of the present disclosure.

Examples are described herein in the context of locally storing a chat log at an on-premises data center. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

One common way in which people communicate over the Internet is through text chats. To engage in a text chat conversation, the participants can execute chat client software on their client devices (e.g., laptop computers, smartphones, or desktop computers). The chat client software may be a specialized chat-client application, a website browser, or any other suitable software for facilitating the chat conversation. The chat client software can generate chat interfaces through which the users can submit their chat messages (e.g., text chat messages) and view chat messages sent by other participants in the chat conversation. While in some situations these text chats may occur directly via peer-to-peer connections, in most cases these text chats are facilitated by chat service providers. For example, users may chat with one another using Zoom Chat by Zoom Video Communications® ("Zoom"). Zoom Chat is a cloud-based chat service that allows the participants to engage in text chats with one another. In these arrangements, the chat service provider normally has a chat server system to which the participants connect with their client devices (e.g., over the Internet) to engage in a chat conversation. The chat service provider may also create a log of the chat conversation and maintain the chat log on their servers.

One problem with the above arrangement is that the chat log is created and maintained on the chat service provider's servers. This can make it harder to control access to the chat log, which may be a security concern. If the chat log contains personally identifiable information or confidential information, the ability to control access to the chat log may be of paramount importance. Certain geographical regions (e.g., states and countries) also have regulations imposing restrictions on where and how such chat logs may be stored. Remotely storing chat logs with a third party may violate those regulations.

Some examples of the present disclosure can overcome one or more of the abovementioned problems by providing a server node that can locally store a copy of a chat log in a local data center associated with a participant in a chat conversation. The server node may be deployed in a data center of an entity (e.g., a company) associated with the participant in the chat conversation. When the participant submits a chat message using their client device to the chat server system of the chat service provider, the chat server system can forward the chat message to some or all of the other participants in the chat conversation. The chat server system can also determine which data center of the entity is geographically proximate to the participant that submitted the chat message. The chat server system can then transmit a copy of the chat message to the server node located in that data center. The server node can receive the chat message and, in response, transmit a command to a local database system in the data center for causing the local database system to add the chat message to a local chat log associated with the chat conversation. In this way, a copy of the chat message can be stored in a local data center associated with the participant.

In some examples, the chat server system can also forward the chat message to one or more other data centers that are associated with one or more of the other participants in the chat conversation, so that copies of the chat message can also be stored in those data centers. The chat message can be received at the other data centers by other server nodes in those data centers, which can likewise transmit commands to their local database systems for storing local copies of the chat log thereon. Using these techniques, one or more copies of the chat log can be stored in the local data centers of the chat participants, so that the owners of the data centers can maintain control over the chat logs, rather than the chat service provider. In some examples, the data centers may all belong to the same company, which is different from the chat service provider. For instance, the data centers may belong to a company that is an employer of the participants in the chat conversation.

In some examples, the chat service provider can create and provide the server node software that is to be deployed in the data centers. Using the server node software, an administrator of the data centers can deploy the server nodes in the data centers and configure them as desired. The chat service provider may also provide an option to enable or disable remote logging of chat conversations on the chat server system. The administrator may be able to selectively configure the option through an administrative portal to disable remote chat logging, if they only want copies of the chat logs stored locally in their data centers.

This illustrative example is given to introduce the reader to the general subject matter discussed herein and the disclosure is not limited to this example. The following sections describe various additional non-limiting examples.

FIG. 1 shows a block diagram of an example of a system 100 according to some aspects of the present disclosure. The system 100 includes multiple data centers 104a-b that belong to (e.g., are owned or operated by) the same entity 136, such as a company or organization. The data centers 104a-b may form at least part of the physical infrastructure of the entity's computer network 130. Although only two data centers are shown for simplicity, the entity's computer network 130 may include any number of data centers.

Each of the data centers in the entity's computer network 130 corresponds to a respective geographical region and may be used to store copies of chat messages originating from that geographical region. For example, the data center 104a can store copies of chat messages originating from the same geographical region as the data center 104a. Similarly, data center 104b can store copies of chat messages originating from the same geographical region as the data center 104b. The data centers can be in a different counties, cities, states, countries, or continents than one another and, accordingly, correspond to different geographical regions. Different client devices 112a-b may be assigned different data centers 104a-b in which their chat logs will be stored. The data center that is assigned to store the chat logs associated with a client device may be the data center that is physically closest to the client device. Alternatively, the data center that is assigned to store the chat logs associated with a client device may be determined based on security restrictions, group policies, legal regulations, and/or other factors.

The client devices 112a-b can connect to the data centers 104a-b and/or a chat server system 102 via one or more networks 128. The one or more networks 128 can include one or more private networks (e.g., a local area networks or a virtual private network) and/or one or more public networks, such as the Internet. Although the client devices 112a-b are shown as external to the entity's computer network 130, in other examples the client devices 112a-b may be internal to the entity's computer network 130. Examples of the client devices 112a-b can include laptop computers, desktop computers, smartphones, tablets, e-readers, smartwatches, or any combination of these.

The client devices 112a-b are operated by respective users 122a-b. The users 122a-b may be employees of the entity 136 or otherwise affiliated with the entity 136. If the users 122a-b wish to engage in a chat conversation (e.g., a text chat), they can execute chat client software on their client devices 112a-b. The chat client software can generate chat interfaces 114a-b, through which the users 122a-b can input chat messages (e.g., text chat messages) to engage in the conversation. The chat interfaces 114a-b can be configured to display chat messages sent by some or all of the participants in the chat conversation.

The chat conversation can be a persistent chat conversation, in the sense that the conversation history is stored and at least a portion of the conversation history can be recalled and presented in the participants' chat interfaces when they login. For example, some number of the most-recent chat messages, or all chat messages that have accumulated since a participant's last login, may be recalled and presented to each participant of the chat conversation when they login. This can allow the participants to quickly get up-to-speed and understand the context behind the ongoing conversation. Because the chat conversation is kept "alive" and persists independently of whether the participants are actually engaged in the conversation, the participants can easily jump in and out of the conversation as desired, without losing key contextual information.

To facilitate this persistence, the chat conversation can take place within the context of a chat channel 120. A chat channel 120 is virtual location that includes chat messages exchanged by the participants of the chat channel 120. Typically, the chat messages are a time-ordered series of text or other types of chat messages that participants of the chat channel 120 can review at their leisure and provide their own replies. Chat channels are persistent in that the chat channel 120 exists independently of whether any participant of the chat channel 120 is actively engaged with the chat channel 120. Instead, the participants can access the chat channel 120 whenever is convenient and view whatever new messages have accumulated since their last visit, or enter their own messages which are then posted to the chat channel 120 for others to see.

The chat channel 120 may be public or private. A public chat channel can be a chat channel that is open to the public for participation. Anyone connected to the system 100 may participate in the public chat channel. A private chat channel can be a chat channel that is somehow limited in its accessibility. For example, the chat channel 120 may only accessible to a designated group of users. Users may be selectively granted access to the chat channel 120 by a channel host or other channel participant. Users who are not expressly authorized to access in the chat channel 120 are prohibited from doing so. Additionally or alternatively, the chat channel 120 may be configured as an internal chat channel. An internal chat channel is a chat channel that can only be accessed by users who are connected to the entity's computer network 130 (e.g., via the data centers 104a-b). Thus, users that are not connected to the entity's computer network 130 would not be able to access the internal chat channel.

To participate in the chat conversation, the user 122a can submit a chat message 118 to a chat channel 120. To do so, the user 122a can input the chat message 118 to the chat interface 114a executing on their client device 112a. The client device 112a can then transmit the chat message 118 to the chat server system 102. The chat server system 102 can receive the chat message 118 and forward the chat message 118 to other client devices associated with other users participating in the chat conversation via one or more networks 128.

The chat server system 102 is a centralized (e.g., cloud) server system configured to facilitate chat conversations. The chat server system 102 may be operated by a chat service provider 138, such as Zoom. The chat service provider 138 is different from the entity 136 operating the computer network 130. The chat server system 102 can handle the majority of the chat functionality. By offloading the majority of the chat functionality to the chat service provider 138, the entity's computer network 130 may be devoted to performing other tasks.

The chat server system 102 can include any number of servers. For example, the chat server system 102 can include one or more chat servers for establishing chat channels and forwarding chat messages associated with the chat channels to the appropriate recipients. The chat server system 102 can also include one or more account servers. The account servers can provide users with the ability to sign up for accounts with the chat server system 102, so that they can engage in chat conversations. The chat server system 102 can also include one or more authentication servers. The authentication servers may provide the authentication mechanisms that allow users to login to their accounts (e.g., by validating their usernames and passwords). The authentication servers may further control which users can access which chat conversations. For instance, the authentication servers can grant or deny users access to chat channels based on their subscriptions, their authentication levels, and/or the settings associated with the chat channels. The chat server system 102 may also have other servers, such as database servers for storing various types of information.

After receiving the chat message 118, the chat server system 102 can determine which other participants are subscribed to the chat channel 120 and forward the chat message 118 to their respective client devices. In particular, the chat server system 102 can access a list of subscribers to the chat channel 120 and forward the chat message 118 to the other subscribers. Users may selectively subscribe and unsubscribe to chat channels as desired and permitted. In the example shown in FIG. 1, the chat server system 102 can access the subscriber list, determine that the other user 122*b* is subscribed to the chat channel 120, and forward the chat message 118 to the other client device 112*b* of the other user 122*b*. The chat message 118 can then be displayed in the chat interface 114*b* to the other user 122*b*.

After receiving the chat message 118, the other user 122*b* may respond to the chat message 118. To do so, the other user 122*b* can input their own chat message into the chat interface 114*b* of their client device 112*b*. The client device 112*b* can then transmit the chat message to the chat server system 102, at which point the chat message will propagate through the system 100 to the client device 112*a* of the first user 122*a* using the same process as described above, only in reverse. In this way, bidirectional textual communication can be achieved between the client devices 112*a-b*.

In some situations, the chat server system 102 may store a log of the conversation (e.g., a copy of the conversation history) for one or more reasons, such as to facilitate the operation of the chat channel 120. Such logs are referred to herein as chat logs. For example, the chat server system 102 may maintain a chat log for the chat channel 120. Using the chat log, the chat server system 102 can provide at least some of the logged messages to the users 122*a-b* when they login to the chat channel 120, which helps to provide the contextual cues described above. This can allow the users 122*a-b* to access any messages they may have missed while logged out. But, there are situations where storing a chat log with a chat service provider 138 is problematic. For example, some countries impose regulations against this type of arrangement because it is harder for the entity 136 to control access to the chat logs 126*a-b*, which may contain sensitive data like personally identifiable information or confidential information. In those countries, it may be a legal requirement that entities retain complete control over their data, including chat logs. Other reasons may also make it desirable for entities to retain control over their chat logs.

To enable this control over chat logs, in some examples, the chat server system 102 can be modified to cooperate with server nodes 106*a-b* deployed in the data centers 104*a-b*. The server nodes 106*a-b* may be physical or virtual servers executing specialized software to facilitate various aspects described herein. An administrator of the entity's computer network 130 can deploy the server nodes 106*a-b* in the data centers 104*a-b*. The server nodes 106*a-b* can interface with the chat server system 102 to facilitate storage of chat logs in the on-premises data centers 104*a-b* of the entity 136.

More specifically, when a client device 112*a* transmits a chat message 118 to the chat server system 102 to engage in a chat conversation, the chat server system 102 can determine a data center 104*a* to which the client device 112*a* is assigned and transmit the chat message 118 to the data center 104*a* for storage thereon. In particular, the chat server system 102 can transmit the chat message to the server node 106*a* of the data center 104*a*. In response, the server node 106*a* can locally store the chat message 118 in a chat log 126*a* inside the data center 104*a*. The server node 106*a* can be configured to perform this local storage for any suitable reason. For example, the server node 106*a* can perform this local storage if the data center 104*a* is in a geographical location that requires the entity 136 to retain local control over the chat log 126*a*. To configure the server node 106*a* to locally store the chat log 126*a*, a local storage setting may be enabled (e.g., by an administrator) on the server node 106*a*. The server node 106*a* can determine if the local storage setting is enabled. If so, server node 106*a* can transmit a command 124*a* to a database system 108*a* in response to receiving the chat message 118. The command 124*a* may be, for example, a write command. The database system 108*a* can be local to the data center 104*a* for storing chat data in one or more onsite databases. In response to receiving the command 124*a*, the database system 108*a* can add the chat message 118 to a chat log 126*a* associated with the chat conversation (e.g., chat channel 120). If the chat message 118 is the first message in the chat conversation, the database system 108*a* may first create the chat log 126*a* and then add the chat message 118. The database system 108*a* can store any number of chat logs corresponding to any number of chat channels. As new messages are received from users in relation to various chat channels, the server node 106*a* can command the database system 108*a* to update the corresponding chat logs accordingly.

In some examples, the server node 106*a* can also transmit the chat message 118 to a message indexing system 110*a* deployed in the data center 104*a*. The message indexing system 110*a* may store its own copy of the chat message 118 in its own database for indexing purposes. Thus, at least two copies of the same chat message 118 can be retained onsite at the data center 104*a*. The message indexing system 110*a* can index received chat messages to make them easier to recall at a later time. An administrator or other user may submit queries to the server node 106*a*, which can then forward the queries to the message indexing system 110, for example to search for messages that meet certain search criteria. The search results may then be returned from the message indexing system 110 to the server node 106*a*, which can forward the search results to the requestor. In some examples, the message indexing system 110*a* can be elastic and scalable. For instance, the message indexing system 110*a* may include a computing cluster with any number of services (e.g., microservices or serverless functions) configured to facilitate the indexing, storage, and retrieval of chat messages. The services can be scaled up and down as desired, for example depending on the load.

In some examples, the chat server system 102 may forward the chat message 118 to multiple data centers associated with multiple participants in the chat conversation. For example, the chat server system 102 can also forward the chat message 118 to the server node 106*b* of the other data center 104*b*, which can be associated with the other user 122*b*. The other server node 106*b* can be configured to perform similar functionality as the server node 106*a* described above. For example, the server node 106*b* can determine whether a local storage setting is enabled on the server node 106*b*. If so, in response to receiving the chat message 118, the server node 106*b* can issue a command 124*b* to a database system 108*b* of the data center 104*b*. Based on the command 124*b*, the database system 108*b* can add the chat message 118 to a chat log 126*b* associated with the chat conversation. In this way, one or both of the data centers 104*a-b* may retain local copies of the chat logs 126*a-b*, and the local copies can be kept synchronized with one another. In some examples, the server node 106*b* may also transmit the chat message 118 to its own message indexing system 110*b*, which can operate similarly to the message indexing system 110*a* described above.

To prevent the chat server system 102 from creating its own chat log associated with the chat conversation (e.g., the chat channel 120), an administrator may deactivate a remote storage option provided by the chat server system 102. The administrator, who may be affiliated with the entity 136, can have access to an administrative portal 140 provided by the chat server system 102. Through the administrative portal 140, the administrator may be able to selectively enable or disable a remote storage setting 132 (e.g., a cloud storage setting) associated with the entity's conversations. Once the remote storage setting 132 is disabled, the chat server system 102 will not store a chat log associated with the chat channel 120. As a result, the only copies of the chat logs 126*a-b* will be locally stored onsite at the entity's data centers 104*a-b*.

Because the chat logs 126*a-b* are only stored in the data centers 104*a-b*, when the users 122*a-b* log into the chat system to access the chat channel 120, the chat server system 102 can coordinate with the server nodes 106*a-b* to pull the conversation history from the users' corresponding data centers 104*a-b* and provide it to them (e.g., rather than pulling the conversation history from its own cloud storage). For example, if the user 122*a* logs out of the chat channel 120 and logs in again at a later time, the chat server system 102 can coordinate with the server node 106*a* to obtain some or all of the intervening chat messages from the database system 108*a* and provide those chat messages to the user 122*a*. Similarly, if the user 122*b* logs out of the chat channel 120 and logs in again at a later time, the chat server system 102 can coordinate with the server node 106*b* can retrieve some or all of the intervening chat messages from the database system 108*b* and provide them to the user 122*b*.

To improve the security of the system 100, in some examples the communications between the chat server system 102 and the server nodes 106*a-b* may be encrypted. For example, the communications between the server nodes 106*a-b* and the chat server system 102 may be hypertext transfer protocol secure (HTTPS) communications, which can be encrypted using an encryption key of the chat service provider 138 or the entity 136. Since the communications may include copies of the chat messages, encrypting the communications may provide a layer of security to the chat messages.

The chat logs 126*a-b* may also be encrypted when stored in the database systems 108*a-b*. This may provide another layer of security. For example, the first server node 106*a* may have one or more security keys 134*a* usable to encrypt and decrypt the first chat log 126*a*. Examples of the security keys 134*a* can include a public key and a private key of an asymmetric key pair. The second server node 106*b* may also have one or more security keys 134*b* usable to encrypt and decrypt the second chat log 126*b*. The one or more security keys 134*b* used by second server node 106*b* may be the same as, or different from, the one or more security keys 134*a* used by first server node 106*a*. The server nodes 106*a-b* can each use their respective security keys 134 to encrypt incoming messages for storage in the database systems 108*a-b* and to decrypt stored messages for delivery to the users 122*a-b*. The security keys 134 may be kept secret from anyone outside the entity 136, for example from the chat service provider 138, so that external parties cannot access the stored chat logs 126*a-b*. The security keys 134 may also be kept secret from various parties within the entity 136, to prevent them from accessing the chat logs 126*a-b*.

Even though the server nodes 106*a-b* are installed in the data centers 104*a-b*, the software executing on the server nodes 106*a-b* may be created and updated by the chat service provider 138. For example, the chat service provider 138 may create and provide the server software that is deployed on the server nodes 106*a-b*. Over time, the chat service provider 138 may also create updates to the server software (e.g., to fix bugs or add new features) and provide (e.g., push) those server updates to the server nodes 106*a-b*. The server updates may help the server nodes 106*a-b* remain in sync with the chat server system 102 and/or each other, in terms of their functionality and compatibility, to keep the system 100 operating smoothly. Additionally or alternatively, the chat service provider 138 may create and provide updates to the database systems 108*a-b*. For instance, the chat service provider 138 may create and push updates intended for the databases systems 108*a-b* to the server nodes 106*a-b*, which in turn can transmit those updates to the database systems 108*a-b*. Thus, the server nodes 106*a-b* can act as a conduit for updates to the database systems 108*a-b*. The database updates can help ensure that the database systems 108*a-b* remain compatible with, and coordinate properly with, the server nodes 102*a-b*.

Figure 2:
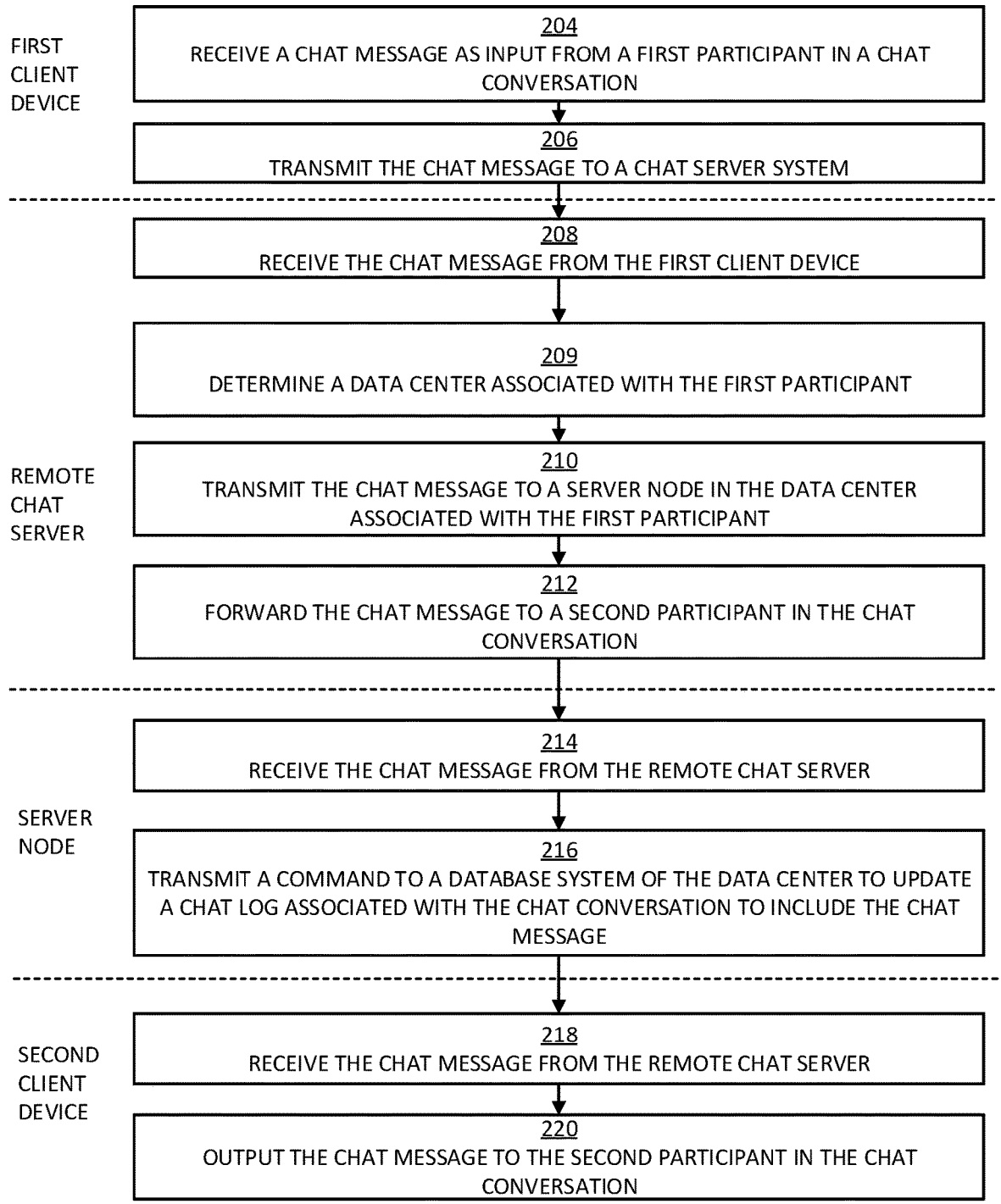
FIG. 2 shows a flowchart of an example of a process for locally storing chat logs at an on-premises data center according to some aspects of the present disclosure.

Turning now to FIG. 2, shown is a flowchart of an example of a process for locally storing a chat conversation history at an on-premises data center according to some aspects of the present disclosure. Other examples may involve more operations, fewer operations, different operations, or a different order of operations than is shown in FIG. 2. The operations of FIG. 2 are described below with reference to the components described above.

In block 204, a first client device 112*a* receives a chat message 118 as input from a first participant (e.g., user 122*a*) in a chat conversation. The chat message 118 can be a text message and the chat conversation can be a textual conversation. The first client device 112*a* can receive the chat message 118 via a chat interface 114*a* generated by chat client software executing on the first client device 112*a*. For example, the first participant can type the chat message 118 into the chat interface 114*a* using a keyboard or touchscreen display.

Before or after receiving the chat message 118, the first client device 112*a* can establish a connection to a remote chat server (e.g., chat server system 102). For example, the first client device 112*a* can establish a network connection to the remote chat server. The first client device 112*a* may use its chat client software to establish the network connection.

In block 206, the first client device 112*a* transmits the chat message 118 to the remote chat server. The first client device 112*a* can transmit the chat message 118 to the remote chat server via a network 128 (e.g., a public network or a private network).

In block 208, the remote chat server receives the chat message 118 from the first client device 112*a*. The remote chat server is located outside the entity's computer network 130 and may belong to a chat service provider 138.

In block 209, the remote chat server determines a data center 104*a* associated with the first participant. For example, the remote chat server can determine a data center to which to forward the chat message 118 based on a subscriber list and/or a data-center assignment list. The subscriber list can indicate which participants are subscribed to the chat conversation (e.g., the chat channel 120). The data-center assignment list can indicate which data center is assigned to each participant. For instance, the remote chat server can access the subscriber list to determine that the first participant (e.g., user 122*a*) and the second participant (e.g., user 122*b*) are both subscribed to the chat conversation. The remote chat server can then access the data-center assignment list, which can be a predefined list of assignments, to determine that the first participant is assigned to the first data center 104*a* and the second participant is assigned to the second data center 104*b*. Alternatively, the remote chat server can dynamically determine which data center to assign to a participant based on one or more factors, such as a characteristic of the participant, a legal requirement, and/or a corporate policy. Either way, after determining which data center corresponds to a participant, the remote chat server can forward the chat message 118 to the server node at that data center. For example, based on determining that the first participant is assigned to the first data center 104*a* and the second participant is assigned to the second data center 104*b*, the remote chat server can forward copies of the chat message 118 to the first server node 106*a* and the second server node 106*b*, respectively.

In block 210, the remote chat server transmits the chat message 118 to a server node 106*a* in the data center 104*a* associated with the first participant. Prior to transmitting the chat message 118 to the server node 106*a*, the remote chat server can establish a network connection to the server node 106*a*. The network connection may be secure connection established using one or more encryption techniques.

In block 212, the remote chat server forwards the chat message 118 to a second participant in the chat conversation. For example, the remote chat server can forward the chat message 118 to a second client device 112*b* of the second participant in the chat conversation. Prior to forwarding the chat message 118 to the second client device 112*b*, the remote chat server can establish a connection to the second client device 112*b*. For example, the remote chat server can establish a network connection to the second client device 112*b*. The second client device 112*b* may use its chat client software to establish the network connection.

In block 214, the server node 106*a* receives the chat message 118 from the remote chat server.

In block 216, the server node 106*a* transmits a command 124*a* to a database system 108*a* of the data center 104*a*. The command 124*a* can be configured to cause the database system 108*a* to add the chat message 118 to a chat log 126*a* associated with the chat conversation. Prior to transmitting the command 124*a* to the database system 108*a*, the server node 106*a* can establish a network connection to the database system 108*a*.

In some examples, the command 124*a* may include the chat message 118 in its normal format (e.g., unencrypted format). In some such examples, after receiving the chat message 118 from the server node 106*a*, the database system 108*a* may encrypt the chat message 118 and add the encrypted chat message to the chat log 126*a*. To perform this encryption, the database system 108*a* may have a security key 134*a*. The server node 106*a* may not have access to the security key 134*a*. In other examples, the server node 106*a* can encrypt the chat message 118 using the security key 134*a* prior to providing the chat message 118 to the database system 108*a* for storage thereon.

In block 218, the second client device 112*b* receives the chat message 118 from the remote chat server. The second client device 112*b* can receive the chat message 118 from the remote chat server via a network (e.g., a public network or a private network), which may be the same as or different from the network through which the first client device 112*a* is connected to the remote chat server.

In block 220, the second client device 112*b* outputs the chat message 118 to a second participant of the chat conversation. For example, the second client device 112*b* can output the chat message 118 in a chat interface 114*b*, which may be a graphical user interface output on a display of the second client device 112*b*.

In some examples, the second participant can input their own chat message into the second client device 112*b* (e.g., via the chat interface 114*b*). The second participant can input the chat message, for example, by typing it in using a keyboard or touchscreen display. This would trigger the same process in reverse, so as to deliver the chat message to the first participant.

Figure 3:
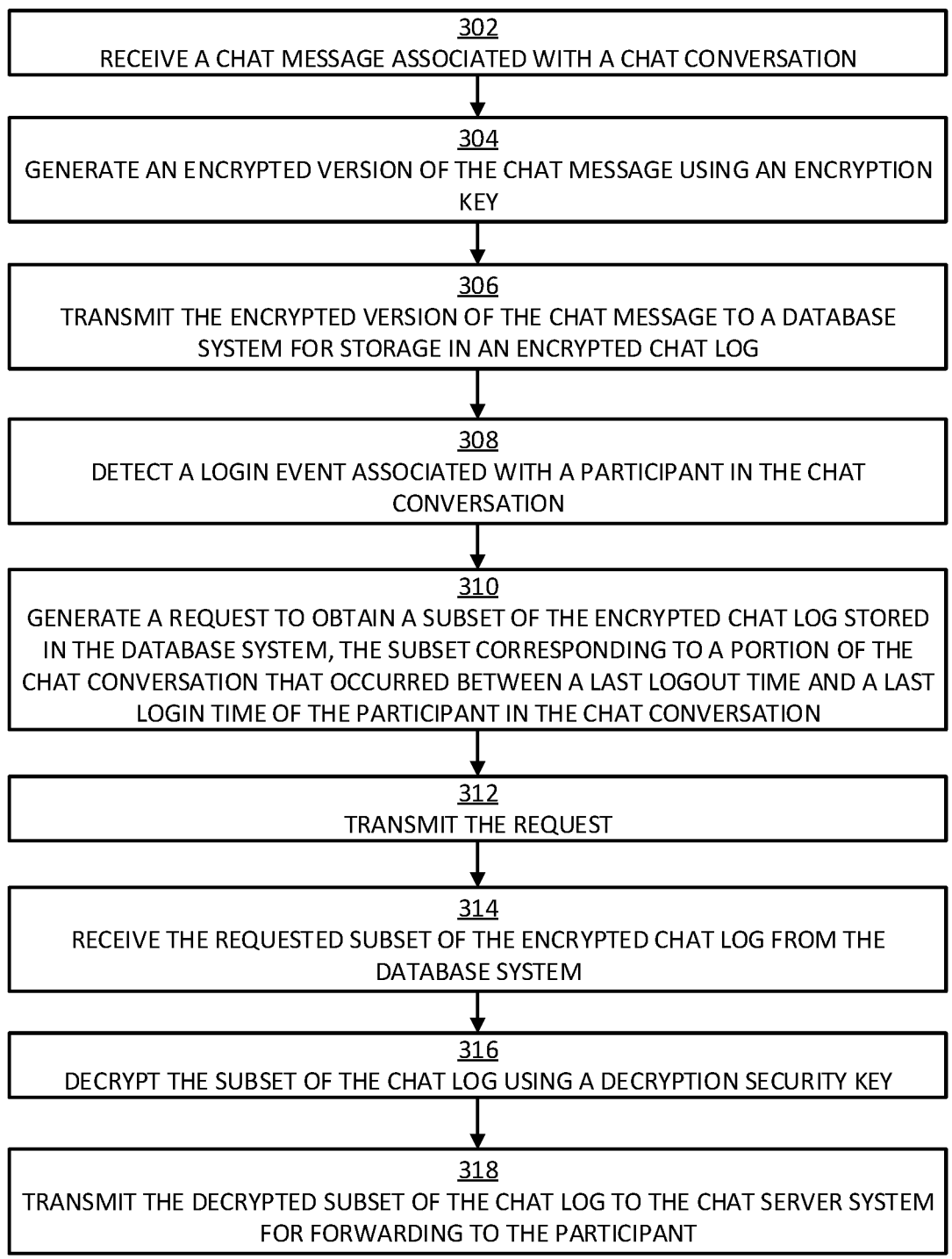
FIG. 3 shows a flowchart of an example of a process for message encryption and retrieval according to some aspects of the present disclosure.

As noted earlier, in some examples the system can use encryption techniques to secure messages against unauthorized access. One example of these encryption techniques is shown in FIG. 3, which will now be described. Other examples may involve more operations, fewer operations, different operations, or a different order of operations than is shown in FIG. 3. The operations of FIG. 3 are described below with reference to the components described above.

In block 302, a server node 106*a* receives a chat message 118 associated with a chat conversation. The chat message 118 was submitted by the user 122*a* via their client device 112*a*. The server node 106*a* can receive the chat message 118 from the chat server system 102, as described above.

In block 304, the server node 106*a* generates an encrypted version of the chat message 118 using an encryption key (e.g., security key 134*a*). If the encryption key is a symmetric key, then the same key may be used for both encrypting and decrypting the chat message 118. If the encryption key is a public key of an asymmetric key pair, then a corresponding private key of the asymmetric key pair may be used to decrypt the chat message 118 later on (e.g., in block 216). Any suitable encryption technique may be used.

In block 306, the server node 106*a* transmits the encrypted version of the chat message to a database system 108*a* for storage in an encrypted chat log (e.g., chat log 126*a*). An encrypted chat log can be a chat log that contains encrypted chat messages. By performing steps 302-306, the server node 106*a* can facilitate the storage of the chat messages in an encrypted format to improve the security of the system.

In block 308, the chat server system 102 detects a login event associated with a participant in the chat conversation, where the participant is different from the user 122*a* that created the chat message 118. For example, the chat server system 102 can receive a login request from the participant's client device, which may be connected to the chat server system 102. The login request may be a request to login to the participant's account to access the chat conversation. As another example, the chat server system 102 can detect that the participant has logged into their account. Either of these situations can constitute a login event. The participant may have been logged out of their account at the time the user 122*a* submitted the chat message 118 to the chat conversation.

In block 310, the chat server system 102 generates a request to obtain a subset of the encrypted chat log stored in the database system 108*a*. The chat server system 102 can generate the request in response to detecting the login event. The subset can correspond to a portion of the chat conversation that occurred between a last logout time and a last login time of the participant. The subset may include some or all of the chat messages that were submitted by one or more users between the last logout time and the last login time of the participant. For instance, the subset may include the chat message 118 submitted by the user 122*a* while the participant was logged out. In some examples, the subset may also include older messages (e.g., messages submitted before the last logout time of the participant, which the participant may have already seen), to provide additional contextual information to the participant.

In block 312, the chat server system 102 transmits the request to the server node 106*a*, which in turn transmits a corresponding query to the database system 108*a*. The server node 106*a* may transmit the query to the database system 108*a* via one or more networks, such as an internal network of the data center 104*a*. The database system 108*a* can receive the query and provide the requested subset of the encrypted chat log to the server node 106*a*.

In block 314, the server node 106*a* receives the requested subset of the encrypted chat log from the database system 108*a*.

In block 316, the server node 106*a* decrypts the subset using a decryption key (e.g., security key 134*a*). The decryption key may be the same as or different than the encryption key, depending on the type of encryption used.

In block 318, the server node 106*a* transmits the decrypted subset of the chat log to the chat server system 102, which in turn forwards the decrypted subset of the chat log to the participant's client device for display to the participant. Through this process, the desired subset of the chat log can be retrieved and provided to the participant by the data center 104*a*.

While the above process involves the server node 106*a* encrypting and decrypting chat messages for enhanced security, in other examples another component of the system 100 may perform the encryption and decryption, in which case the operations of blocks 304 and 316 may be performed by that other component. For example, the database system 108*a* may perform the encryption and decryption. In particular, the database system 108*a* may encrypt the chat message 118 for storage. And, the database system 108*a* can decrypt the chat message 118 prior to providing it back to the server node 106*a* in response to the request. The encryption and decryption may also be skipped in certain situations. For instance, an administrator may be able to selectively enable or disable the message encryption functionality. To do so, the administrator may adjust, for example, a message encryption setting of the server node 106*a* through an administrative portal. If the server node's message encryption functionality is disabled, blocks 304 and 316 may be skipped.

Figure 4:
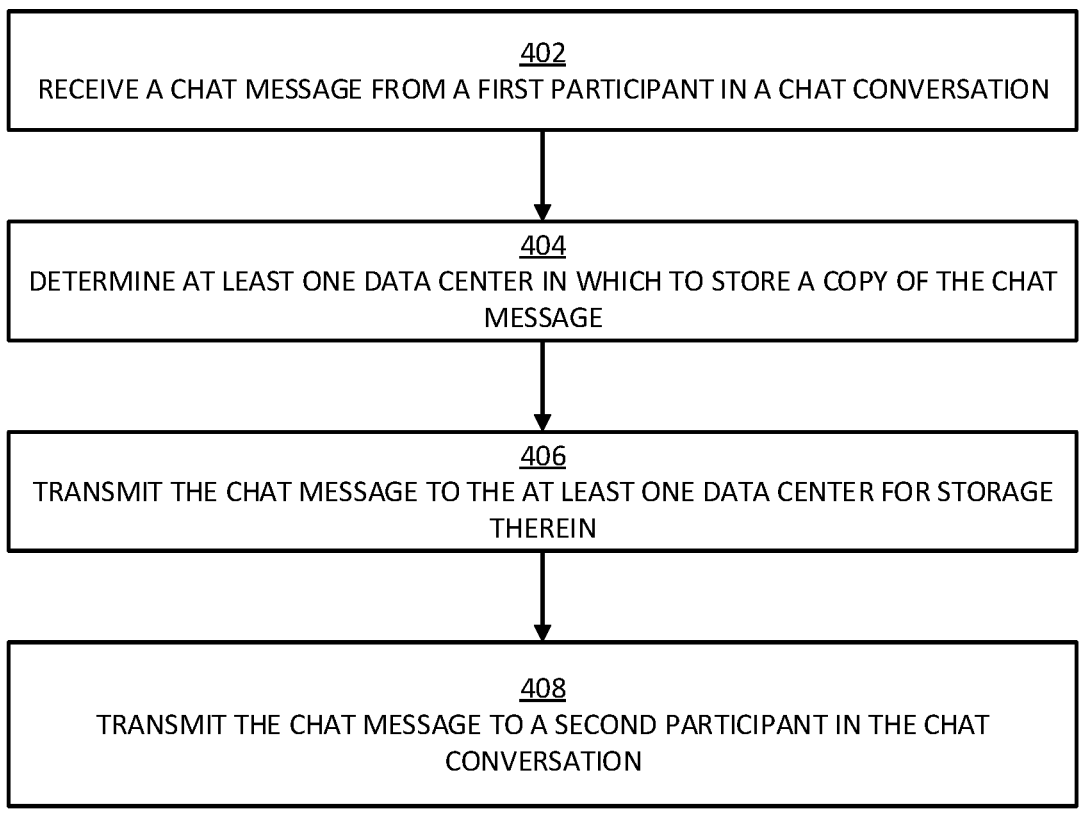
FIG. 4 shows a flowchart of an example of a process for dynamically selecting a location for storing chat logs according to some aspects of the present disclosure.

FIG. 4 shows a flowchart of an example of a process for dynamically selecting a location for storing chat logs according to some aspects of the present disclosure. Other examples may involve more operations, fewer operations, different operations, or a different order of operations than is shown in FIG. 4. The operations of FIG. 4 are described below with reference to the system 100 of FIG. 1 for simplicity, though it will be appreciated that any component or combination of components of the system 100 may perform these operations. For example, one or more server nodes (e.g., server node 106*a-b*), the chat server system 102, or some combination thereof may perform the operations described below. It will also be appreciated that the operations described below may be combined with any of the operations described above, such as the operations of FIG. 2.

In block 402, the system 100 receives a chat message 118 from a first participant (e.g., user 122*a*) in a chat conversation, which may be associated with a chat channel 120. For instance, the server node 106*a* can receive the chat message 118 from the first client device 112*a*.

In block 404, the system 100 determines at least one data center in which to store a copy of the chat message 118. The system 100 can make this determination based on one or more factors, such as corporate policies, a characteristic of a participant in the chat conversation, a geographical location associated with a participant in the chat conversation, the chat channel containing the chat conversation, and/or legal restrictions.

For example, the system 100 can determine a characteristic of a participant in the chat conversation. Examples of the characteristic can include a role, a geographical location, a security clearance level, etc., associated with the participant. Based on the characteristic, the system 100 can select a particular data center 104*b*, from among a plurality of data centers, for storing the chat message 118. In this way, the particular data center(s) in which the chat logs are stored can at least partially depend on the characteristics of the participants in the chat conversation.

As one particular example, it may be a requirement (e.g., a legal, regulatory, or corporate requirement) that the chat logs of any C-suite executives be stored in a specific data center, such as a data center that physically resides in a designated location like the corporate headquarters. In some such examples, the system 100 can determine that a participant of the chat conversation is a C-suit executive. The system 100 may make this determination by consulting an employee directory. Based on the participant having that role, the system 100 can determine that a copy of the chat message is to be stored in a particular data center 104*b*, which may physically reside at the designated location.

As another example, it may be a requirement that the chat logs of any resident or citizen of a certain country be stored in a specific data center, such as a data center that physically resides in that country. In some such examples, the system 100 can determine that a participant of the chat conversation is a citizen of a certain country. The system 100 may make this determination by consulting an employee directory. Based on the participant having that citizenship, the system 100 can determine that a copy of the chat message is to be stored in a particular data center 104*a*, which may physically reside in that country. This data center 104*a* may be in a geographical location that is different than the physical location of the participant. For example, if the participant is traveling in another country, they may be in a physical location that is different than that of the data center 104*b*. Despite that fact, the system 100 can still determine that a copy of the chat log is to be stored in data center 104*a* to comply with the abovementioned legal requirements.

As yet another example, certain chat conversations (e.g., chat channels) may be designated for sensitive information that should be stored in a specific data center. In some such examples, the system 100 can determine that the chat conversation has a certain flag, such as a confidential flag, or is otherwise designated as sensitive. Based on the chat conversation being designated as sensitive, the system 100 can determine that a copy of the chat message is to be stored in a particular data center designated for sensitive information. This data center may be different from the data centers to which some or all of the participants in the chat conversation are connected.

In block 406, the system 100 transmits the chat message 118 to the at least one data center for storage therein. The chat message 118 can be received at the server nodes of the selected data centers, at which point the server nodes can transmit commands to their corresponding database systems for causing the database systems to store copies of the chat message in their local chat logs.

In block 408, the system 100 also transmits the chat message 118 to a second participant (e.g., user 122b) in the chat conversation for delivery to the second participant. The chat message 118 can be received at the client device of the second participant.

Figure 5:
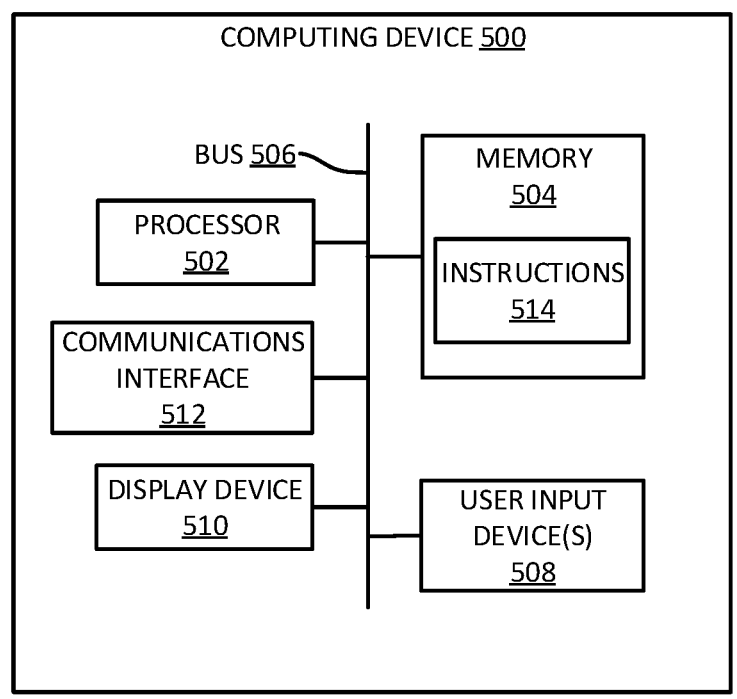
FIG. 5 shows a block diagram of an example of a computing device usable to implement some aspects of the present disclosure.

FIG. 5 shows a block diagram of an example of a computing device 500 usable to implement some aspects of the present disclosure. In some examples, the computing device 500 may correspond to one of the client devices 112a-b, one of the server nodes 106a-b, the chat server system 102, or another computing component described above with respect to FIG. 1.

The computing device 500 includes a processor 502 that is in communication with the memory 504 and other components of the computing device 500 using one or more communications buses 506. The processor 502 is configured to execute processor-executable instructions 514 stored in the memory 504 to perform one or more processes described herein.

As shown, the computing device 500 also includes one or more user input devices 508 (e.g., a keyboard, mouse, touchscreen, video capture device, and/or microphone) to accept user input and the display device 510 to provide visual output to a user. The computing device 500 further includes a communications interface 512. In some examples, the communications interface 512 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a videoconferencing server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Certain aspects and features can be implemented according to one or more of the following examples. As used below, any reference to a series of examples is to be understood as reference to each of those examples disjunctively (E.g., "Examples 1-4" is to be understood as Examples 1, 2, 3, or 4").

Example #1: A system comprising: one or more processors; and one or more memories including instructions that are executable by the one or more processors to cause the one or more processors to: receive a text chat message associated with a chat conversation from a first client device of a first participant in the chat conversation; and in response to receiving the text chat message: determine a data center associated with the first participant; transmit the text chat message to a server node in the data center, the server node being configured to transmit a command to a database system of the data center, the command being configured to cause the database system to store a copy of the text chat message in a chat log associated with the chat conversation; and transmit the text chat message to a second client device of a second participant in the chat conversation.

Example #2: The system of Example #1, wherein the one or more memories further include instructions that are executable by the one or more processors to cause the one or more processors to transmit the text chat message to another server node in another data center associated with the second participant, wherein the other server node is configured to: receive the text chat message; and transmit another command to another database system of the other data center, the other command being configured to cause the other database system to store another copy of the text chat message in another chat log associated with the chat conversation.

Example #3: The system of any of Examples #1-2, wherein the server node is configured to: generate an encrypted version of the text chat message using a security key; and provide the encrypted version of the text chat message to the database system as part of the command, the database system being configured to store the encrypted version of the text chat message in the chat log.

Example #4: The system of any of Examples #1-3, wherein the one or more memories further include instructions that are executable by the one or more processors to cause the one or more processors to: determine whether a local storage setting is enabled; and based on determining that the local storage setting is enabled, transmit the text chat message to the server node; or based on determining that the local storage setting is disabled, forgo transmitting the text chat message to the server node.

Example #5: The system of any of Examples #1-4, wherein the server node is further configured to: transmit the text chat message to a message indexing system that is separate from the server node, the message indexing system being configured to store another copy of the text chat message in a datastore that is separate from the database system.

Example #6: The system of any of Examples #1-5, wherein the data center and belongs to a first entity, and wherein the one or more processors belong to a second entity that is different than the first entity.

Example #7: The system of any of Examples #1-6, wherein the one or more memories further include instructions that are executable by the one or more processors to cause the one or more processors to: generate a request to obtain a subset of the chat log stored in the database system, the subset corresponding to a portion of the chat conversation that occurred between a last logout time and a last login time of the first participant in the chat conversation; transmit the request the server node in the data center, the server node being configured to transmit a corresponding query to the database system; receive the subset of the chat log from the server node; and transmit the subset of the chat log to the first client device for display in a chat interface to the first participant.

Example #8: The system of Example #7, wherein the subset of the chat log is stored in an encrypted format in the database system, and wherein the server node is further configured to: receive the subset of the chat log in the encrypted format from the database system; decrypt the subset of the chat log using a security key to produce a decrypted subset of the chat log; and transmit the decrypted subset of the chat log to the one or more processors as a response to the request.

Example #9: A method comprising: receiving, by one or more processors, a text chat message associated with a chat conversation from a first client device of a first participant in the chat conversation; and in response to receiving the text chat message: determining, by the one or more processors, a data center associated with the first participant; transmitting, by the one or more processors, the text chat message to a server node in the data center, the server node being configured to transmit a command to a database system of the data center, the command being configured to cause the database system to store a copy of the text chat message in a chat log associated with the chat conversation; and transmitting, by the one or more processors, the text chat message to a second client device of a second participant in the chat conversation.

Example #10: The method of Example #9, further comprising transmitting the text chat message to another server node in another second data center associated with the second participant, wherein the other server node is configured to: receive the text chat message; and transmit another command to another database system of the other data center, the other command being configured to cause the other database system to store another copy of the text chat message in another chat log associated with the chat conversation.

Example #11: The method of any of Examples #9-10, wherein the server node is configured to: generate an encrypted version of the text chat message using a security key; and provide the encrypted version of the text chat message to the database system as part of the command, the database system being configured to store the encrypted version of the text chat message in the chat log.

Example #12: The method of any of Examples #9-11, further comprising: determining whether a local storage setting is enabled; and based on determining that the local storage setting is enabled, transmitting the text chat message to the server node; or based on determining that the local storage setting is disabled, forging transmitting the text chat message to the server node.

Example #13: The method of any of Examples #9-12, wherein the server node is further configured to: transmit the text chat message to a message indexing system that is separate from the server node, the message indexing system being configured to store another copy of the text chat message in a datastore that is separate from the database system.

Example #14: The method of any of Examples #9-13, wherein the data center belongs to an entity, and wherein the one or more processors belong to a chat service provider that is different than the entity.

Example #15: The method of any of Examples #9-14, further comprising: detecting a login event associated with the first participant in the chat conversation; and in response to detecting the login event: generating a request to obtain a subset of the chat log stored in the database system, the subset corresponding to a portion of the chat conversation that occurred between a last logout time and a last login time of the first participant in the chat conversation; transmitting the request the server node in the data center, the server node being configured to transmit a corresponding query to the database system; receiving the subset of the chat log from the server node; and transmitting the subset of the chat log to the first client device for display in a chat interface to the first participant.

Example #16: The method of Example #15, wherein the subset of the chat log is stored in an encrypted format in the database system, and wherein the server node is further configured to: receive the subset of the chat log in the encrypted format from the database system; decrypt the subset of the chat log using a security key to produce a decrypted subset of the chat log; and transmit the decrypted subset of the chat log to the one or more processors as a response to the request.

Example #17: A non-transitory computer-readable medium comprising program code that is executable by one or more processors to cause the one or more processors to: receive a text chat message associated with a chat conversation from a first client device of a first participant in the chat conversation; and in response to receiving the text chat message: determine a data center associated with the first participant; transmit the text chat message to a server node in the data center, the server node being configured to transmit a command to a database system of the data center, the command being configured to cause the database system to store a copy of the text chat message in a chat log associated with the chat conversation; and transmit the text chat message to a second client device of a second participant in the chat conversation.

Example #18: The non-transitory computer-readable medium of Example #17, further comprising program code that is executable by the one or more processors to cause the one or more processors to transmit the text chat message to another server node in another second data center associated with the second participant, wherein the other server node is configured to: receive the text chat message; and transmit another command to another database system of the other data center, the other command being configured to cause the other database system to store another copy of the text chat message in another chat log associated with the chat conversation.

Example #19: The non-transitory computer-readable medium of any of Examples #17-18, wherein the server node is configured to: generate an encrypted version of the text chat message using a security key; and provide the encrypted version of the text chat message to the database system as part of the command, the database system being configured to store the encrypted version of the text chat message in the chat log.

Example #20: The non-transitory computer-readable medium of any of Examples #17-19, further comprising program code that is executable by the one or more processors to cause the one or more processors to: determine whether a local storage setting is enabled; and based on determining that the local storage setting is enabled, transmit the text chat message to the server node; or based on determining that the local storage setting is disabled, forgo transmitting the text chat message to the server node.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations thereof in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A system comprising:
one or more processors; and
one or more memories including instructions that are executable by the one or more processors to cause the one or more processors to:
receive a text chat message associated with a chat conversation from a first client device of a first participant in the chat conversation;
determine whether a local storage setting is enabled; and
in response to receiving the text chat message:
determine a data center associated with the first participant;
based on determining that the local storage setting is enabled, transmit the text chat message to a server node in the data center, the server node being configured to:
generate an encrypted version of the text chat message using a security key; and
transmit a command and the encrypted version of the text chat message to a database system of the data center, the command being configured to cause the database system to store a copy of the encrypted version of the text chat message in a chat log associated with the chat conversation; and
transmit the text chat message to a second client device of a second participant in the chat conversation.

2. The system of claim 1, wherein the one or more memories further include instructions that are executable by the one or more processors to cause the one or more processors to transmit the text chat message to another server node in another data center associated with the second participant, wherein the other server node is configured to:
receive the text chat message; and
transmit another command to another database system of the other data center, the other command being configured to cause the other database system to store another copy of the text chat message in another chat log associated with the chat conversation.

3. The system of claim 1, wherein the one or more memories further include instructions that are executable by the one or more processors to cause the one or more processors to:
based on determining that the local storage setting is disabled, forgo transmitting the text chat message to the server node.

4. The system of claim 1, wherein the server node is further configured to:
transmit the text chat message to a message indexing system that is separate from the server node, the message indexing system being configured to store another copy of the text chat message in a datastore that is separate from the database system.

5. The system of claim 1, wherein the data center and belongs to a first entity, and wherein the one or more processors belong to a second entity that is different than the first entity.

6. The system of claim 1, wherein the one or more memories further include instructions that are executable by the one or more processors to cause the one or more processors to:
generate a request to obtain a subset of the chat log stored in the database system, the subset corresponding to a portion of the chat conversation that occurred between a last logout time and a last login time of the first participant in the chat conversation;
transmit the request the server node in the data center, the server node being configured to transmit a corresponding query to the database system;
receive the subset of the chat log from the server node; and
transmit the subset of the chat log to the first client device for display in a chat interface to the first participant.

7. The server node of claim 6, wherein the subset of the chat log is stored in an encrypted format in the database system, and wherein the server node is further configured to:
receive the subset of the chat log in the encrypted format from the database system;
decrypt the subset of the chat log using the security key or another security key to produce a decrypted subset of the chat log; and transmit the decrypted subset of the chat log to the one or more processors as a response to the request.

8. A method comprising:
receiving, by one or more processors, a text chat message associated with a chat conversation from a first client device of a first participant in the chat conversation;
determining, by one or more processors, whether a local storage setting is enabled; and
in response to receiving the text chat message:
  determining, by the one or more processors, a data center associated with the first participant;
  based on determining that the local storage setting is enabled, transmitting, by the one or more processors, the text chat message to a server node in the data center, the server node being configured to:
    generate an encrypted version of the text chat message using a security key; and
    transmit a command and the encrypted version of the text chat message to a database system of the data center, the command being configured to cause the database system to store a copy of the encrypted version of the text chat message in a chat log associated with the chat conversation; and
  transmitting, by the one or more processors, the text chat message to a second client device of a second participant in the chat conversation.

9. The method of claim 8, further comprising transmitting the text chat message to another server node in another second data center associated with the second participant, wherein the other server node is configured to:
receive the text chat message; and
transmit another command to another database system of the other data center, the other command being configured to cause the other database system to store another copy of the text chat message in another chat log associated with the chat conversation.

10. The method of claim 8, wherein the server node is further configured to:
transmit the text chat message to a message indexing system that is separate from the server node, the message indexing system being configured to store another copy of the text chat message in a datastore that is separate from the database system.

11. The method of claim 8, wherein the data center belongs to an entity, and wherein the one or more processors belong to a chat service provider that is different than the entity.

12. The method of claim 8, further comprising:
detecting a login event associated with the first participant in the chat conversation; and
in response to detecting the login event:
  generating a request to obtain a subset of the chat log stored in the database system, the subset corresponding to a portion of the chat conversation that occurred between a last logout time and a last login time of the first participant in the chat conversation;
  transmitting the request the server node in the data center, the server node being configured to transmit a corresponding query to the database system;
  receiving the subset of the chat log from the server node; and
  transmitting the subset of the chat log to the first client device for display in a chat interface to the first participant.

13. The method of claim 12, wherein the subset of the chat log is stored in an encrypted format in the database system, and wherein the server node is further configured to:
receive the subset of the chat log in the encrypted format from the database system;
decrypt the subset of the chat log using the security key or another security key to produce a decrypted subset of the chat log; and
transmit the decrypted subset of the chat log to the one or more processors as a response to the request.

14. A non-transitory computer-readable medium comprising program code that is executable by one or more processors to cause the one or more processors to:
receive a first text chat message associated with a first chat conversation from a first client device of a first participant in the first chat conversation;
determine that a local storage setting is enabled;
in response to receiving the first text chat message:
  determine a data center associated with the first participant; and
  based on determining that the local storage setting is enabled, transmit the first text chat message to a server node in the data center, the server node being configured to transmit a command to a database system of the data center, the command being configured to cause the database system to store a copy of the first text chat message in a chat log associated with the first chat conversation;
transmit the first text chat message to a second client device of a second participant in the first chat conversation;
receive a second text chat message associated with a second chat conversation from a third client device of a third participant in the second chat conversation;
determine that the local storage setting is disabled;
based on determining that the local storage setting is disabled, forgo transmitting the second text chat message to the server node; and
transmit the second text chat message a fourth client device of a fourth participant in the second chat conversation.

15. The non-transitory computer-readable medium of claim 14, further comprising program code that is executable by the one or more processors to cause the one or more processors to transmit the first text chat message to another server node in another data center associated with the second participant, wherein the other server node is configured to:
receive the first text chat message; and
transmit another command to another database system of the other data center, the other command being configured to cause the other database system to store another copy of the first text chat message in another chat log associated with the first chat conversation.

16. The non-transitory computer-readable medium of claim 14, further comprising program code that is executable by the one or more processors to cause the one or more processors to:
generate a request to obtain a subset of the chat log stored in the database system, the subset corresponding to a portion of the first chat conversation that occurred between a last logout time and a last login time of the first participant in the first chat conversation;
transmit the request the server node in the data center, the server node being configured to transmit a corresponding query to the database system;
receive the subset of the chat log from the server node; and
transmit the subset of the chat log to the first client device for display in a chat interface to the first participant.

17. The non-transitory computer-readable medium of claim 16, further comprising program code that is executable by the one or more processors to cause the one or more processors to:
- receive the subset of the chat log in an encrypted format from the database system;
- decrypt the subset of the chat log using a security key to produce a decrypted subset of the chat log; and
- transmit the decrypted subset of the chat log to the one or more processors as a response to the request.

18. The non-transitory computer-readable medium of claim 14, wherein the server node is configured to:
- generate an encrypted version of the first text chat message using a security key; and
- provide the encrypted version of the first text chat message to the database system as part of the command, the database system being configured to store the encrypted version of the first text chat message in the chat log.

19. The non-transitory computer-readable medium of claim 14, wherein the server node is further configured to:
- transmit the first text chat message to a message indexing system that is separate from the server node, the message indexing system being configured to store another copy of the first text chat message in a datastore that is separate from the database system.

20. The non-transitory computer-readable medium of claim 14, wherein the first chat conversation is the same as the second chat conversation.

21. The non-transitory computer-readable medium of claim 14, wherein the first client device is the same as the third client device, and the first participant is the same as the third participant.

22. The non-transitory computer-readable medium of claim 14, wherein the second client device is the same as the fourth client device, and the second participant is the same as the fourth participant.

* * * * *